(12) United States Patent
Hashimoto (10) Patent No.: US 12,491,739 B2
(45) Date of Patent: Dec. 9, 2025

(54) TIRE

(71) Applicant: Sumitomo Rubber Industries, Ltd., Kobe (JP)

(72) Inventor: Yuto Hashimoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 75 days.

(21) Appl. No.: 18/386,864

(22) Filed: Nov. 3, 2023

(65) Prior Publication Data

US 2024/0174028 A1    May 30, 2024

(30) Foreign Application Priority Data

Nov. 24, 2022   (JP) .................................. 2022-187524

(51) Int. Cl.
*B60C 11/12* (2006.01)
*B60C 11/00* (2006.01)
*B60C 11/03* (2006.01)

(52) U.S. Cl.
CPC ........ *B60C 11/1222* (2013.01); *B60C 11/005* (2013.01); *B60C 11/0304* (2013.01);
(Continued)

(58) Field of Classification Search
CPC ............. B60C 11/1281; B60C 11/1218; B60C 11/1263; B60C 11/005; B60C 11/0304; B60C 2011/1213
See application file for complete search history.

(56) References Cited

U.S. PATENT DOCUMENTS 5,176,765 A  *  1/1993  Yamaguchi ........... B60C 11/005
                                                     152/209.7
2010/0212794 A1*  8/2010  Watabe ............... B60C 11/1218
                                                     152/209.18
(Continued)

FOREIGN PATENT DOCUMENTS

DE           2362627 A  *  6/1975  ............. B60C 11/00
DE     102010017702 A1  *  1/2012  ......... B60C 11/0323
(Continued)

OTHER PUBLICATIONS

Machine translation for German 102010017702 (Year: 2025).*
(Continued)

*Primary Examiner* — Steven D Maki
(74) *Attorney, Agent, or Firm* — Birch, Stewart, Kolasch & Birch, LLP (57) ABSTRACT

A tire includes first blocks each with a zigzag first sipe. The first sipe includes a sipe bottom and a tie-bar locally raising outwardly in a tire radial direction from the sipe bottom so as not to reach the ground contact surface to divide the first sipe into first and second portions. The sipe bottom of the first portion communicates with a first widening portion which has a circular cross-section and has a groove width greater than that of the first portion. The first widening portion extends linearly over the entire length. The sipe bottom of the second portion communicates with a second widening portion which has a circular cross-section and has a groove width greater than that of the second portion. The second widening portion extends linearly over the entire length. The first widening portion does not communicate with the second widening portion.

17 Claims, 7 Drawing Sheets

(52) U.S. Cl.
CPC ...... *B60C 11/1218* (2013.01); *B60C 11/1263* (2013.01); *B60C 11/1281* (2013.01); *B60C 2011/1213* (2013.01)

(56) References Cited

U.S. PATENT DOCUMENTS

| | | | |
|---|---|---|---|
| 2011/0083777 A1 | 4/2011 | Hidrot et al. | |
| 2014/0166173 A1 | 6/2014 | Dayet et al. | |
| 2022/0219492 A1 | 7/2022 | Ohsawa | |
| 2022/0402306 A1 | 12/2022 | Härtwig et al. | |
| 2023/0373254 A1* | 11/2023 | Lacko | B60C 11/1281 |
| 2024/0198731 A1* | 6/2024 | Namera | B60C 11/0306 |

FOREIGN PATENT DOCUMENTS

| | | | | |
|---|---|---|---|---|
| DE | 10 2019 217 819 A1 | | 5/2021 | |
| DE | 10 2020 212 456 A1 | | 4/2022 | |
| JP | 01-101205 A | * | 4/1989 | |
| JP | 03-169723 A | * | 7/1991 | ........... B60C 11/005 |
| JP | 2001-130227 A | | 5/2001 | |
| JP | 2014-097697 A | * | 5/2014 | |
| JP | 2021-24554 A | | 2/2021 | |
| JP | 2021-195051 A | | 12/2021 | |
| JP | 2022-71697 A | | 5/2022 | |
| WO | WO-2017/105496 A1 | * | 6/2017 | ........... B60C 11/005 |
| WO | WO-2019/108173 A1 | * | 6/2019 | |
| WO | WO 2021/216041 A1 | | 10/2021 | |

OTHER PUBLICATIONS

Translation for German 2362627 (Year: 2025).*
Machine translation for Japan 01-101205 (Year: 2025).*
Machine translation for Japan 03-169723 (Year: 2025).*
Machine translation for Japan 2014-097697 (Year: 2025).*
Extended European Search Report for European Application No. 23206964.1, dated Mar. 25, 2024.

* cited by examiner

TIRE

RELATED APPLICATIONS

This application claims the benefit of foreign priority to Japanese Patent Application No. JP2022-187524, filed Nov. 24, 2022, which is incorporated by reference in its entirety.

FIELD OF THE DISCLOSURE

The present disclosure is related to a tire.

BACKGROUND OF THE DISCLOSURE

Patent Document 1 below discloses a pneumatic tire intended for use in winter. The outer shoulder land portion of this tire is formed into a plurality of outer shoulder blocks divided by a plurality of outer shoulder lateral grooves extending in the tire axial direction. At least one of the outer shoulder blocks is divided into a first block piece on the outer tread edge side and a second block piece on the inner tread edge side by a first narrow longitudinal groove extending in the tire circumferential direction. Also, the first block piece is provided with a plurality of first sipes, and the second block piece is provided with a plurality of second sipes. Furthermore, the total number of the second sipes in the second block piece is greater than the total number of the first sipes in the first blocks piece.

PATENT DOCUMENT

[Patent Document 1] Japanese Unexamined Patent Application Publication 2021-195051

SUMMARY OF THE DISCLOSURE

In recent years, tires with sipes in the tread portion designed for winter use have been required to perform even better on ice. On the other hand, in these tires, due to the deformation of the land portions caused by the ground load received when the tires come into contact with the ground, the strain tends to concentrate on the bottoms of the sipes, and cracks tend to occur starting from the bottoms. For this reason, these tires have been required to improve the durability of the bottoms of the sipes against the ground load (hereinafter referred to as "load durability").

The present disclosure has been made in view of the above circumstances and has a main object to provide a tire capable of improving on-ice performance and load durability.

In one aspect of the present disclosure, a tire includes a tread portion being provided with a plurality of circumferential grooves continuously extending in a tire circumferential direction, a plurality of lateral grooves extending in a tire axial direction, and a plurality of first blocks, wherein each of the plurality of first blocks is provided with at least one first sipe, the at least one first sipe extends in a zigzag shape in both of a cross-section perpendicular to a sipe length direction and a cross-section parallel to a ground contact surface of the respective first block, the at least one first sipe includes a sipe bottom, and a tie-bar locally raising outwardly in a tire radial direction from the sipe bottom and terminating without reaching the ground contact surface of the respective first block to divide the at least one first sipe into a first portion and a second portion in the sipe length direction, the sipe bottom of the first portion communicates with a first widening portion having a circular shape in a cross-section perpendicular to the sipe length direction, the first widening portion has a groove width greater than a width of the first portion, the first widening portion extends linearly over an entire length thereof along the sipe length direction of the first portion, the sipe bottom of the second portion communicates with a second widening portion having a circular shape in a cross-section perpendicular to the sipe length direction, the second widening portion has a groove width greater than a width of the second portion, the second widening portion extends linearly over its entire length along the sipe length direction of the second portion, and the first widening portion does not communicate with the second widening portion.

DETAILED DESCRIPTION OF THE DISCLOSURE

One or more embodiments of the present disclosure will be described below with reference to the drawings.

Figure 1:
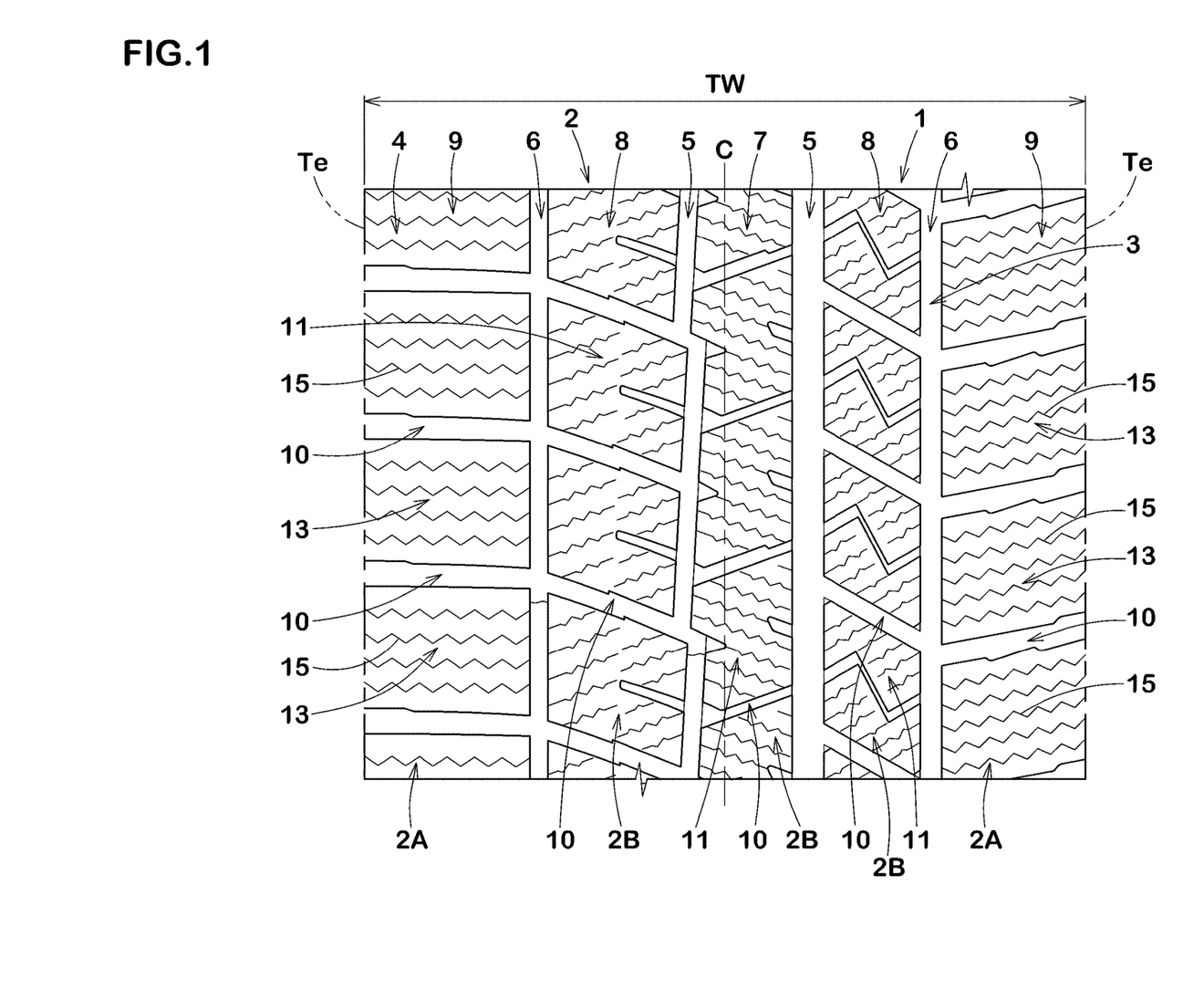
FIG. 1 is a development view of a tread portion of a tire according to an embodiment of the present disclosure.

FIG. 1 is a development view of a tread portion 2 of a tire 1 according to an embodiment. As illustrated in FIG. 1, the tire 1 according to the present disclosure is designed for use in winter. The tire 1 according to the present embodiment is used, for example, as a pneumatic tire for passenger cars. However, the present invention is not limited to such an aspect, and may be applied, for example, to heavy-duty tires.

The tread portion 2 includes a pair of tread edges Te, a plurality of circumferential grooves 3 continuously extending in the tire circumferential direction between the tread edges Te, and a plurality of land portions 4 divided by the plurality of circumferential grooves 3.

The tread edges Te are the axial outermost edges of the ground contacting patch of the tire 1 which occur under the condition such that the tire 1 under a normal state is grounded on a plane with 70% of a standard tire load at zero camber angles.

As used herein, when a tire is a pneumatic tire based on a standard, the "normal state" is such that the tire 1 is mounted onto a standard wheel rim with a standard pressure but loaded with no tire load. If a tire is not based on the standards, or if a tire is a non-pneumatic tire, the normal state is a standard state of use according to the purpose of use of the tire and means a state of no load. As used herein, unless otherwise noted, dimensions of portions of the tire are values measured under the normal state. Furthermore, unless otherwise noted, any of the known methods can be applied to the measurement of the aforementioned dimensions.

As used herein, the "standard wheel rim" is a wheel rim officially approved for each tire by the standard organization on which the tire is based. For example, the standard wheel rim is the "standard rim" specified in JATMA, the "Design Rim" in TRA, and the "Measuring Rim" in ETRTO.

As used herein, the "standard pressure" is a standard pressure officially approved for each tire by the standard organization on which the tire is based. For example, the standard pressure is the "maximum air pressure" in JATMA, the maximum pressure given in the "Tire Load Limits at Various Cold Inflation Pressures" table in TRA, and the "Inflation Pressure" in ETRTO.

As used herein, when a tire is a pneumatic tire based on a standard, the "standard tire load" is a tire load officially approved for each tire by the standard organization on which the tire is based. For example, the standard tire load is the "maximum load capacity" in JATMA, the maximum value given in the above-mentioned table in TRA, and the "Load Capacity" in ETRTO. If a tire is not based on the standards, the "standard tire load" refers to the maximum load that can be applied to the tire in accordance with the above-mentioned standards.

In the present embodiment, the tread portion 2 is provided with four circumferential grooves 3. These circumferential grooves 3 include two crown circumferential grooves 5 and two shoulder circumferential grooves 6. The crown circumferential grooves 5 are arranged such that the tire equator C is located therebetween. The shoulder circumferential grooves 6 are arranged such that the crown circumferential grooves 5 are located therebetween. However, the present disclosure is not limited to such an aspect.

The circumferential grooves 3 may extend linearly or in a zigzag shape in the tire circumferential direction.

Figure 2:
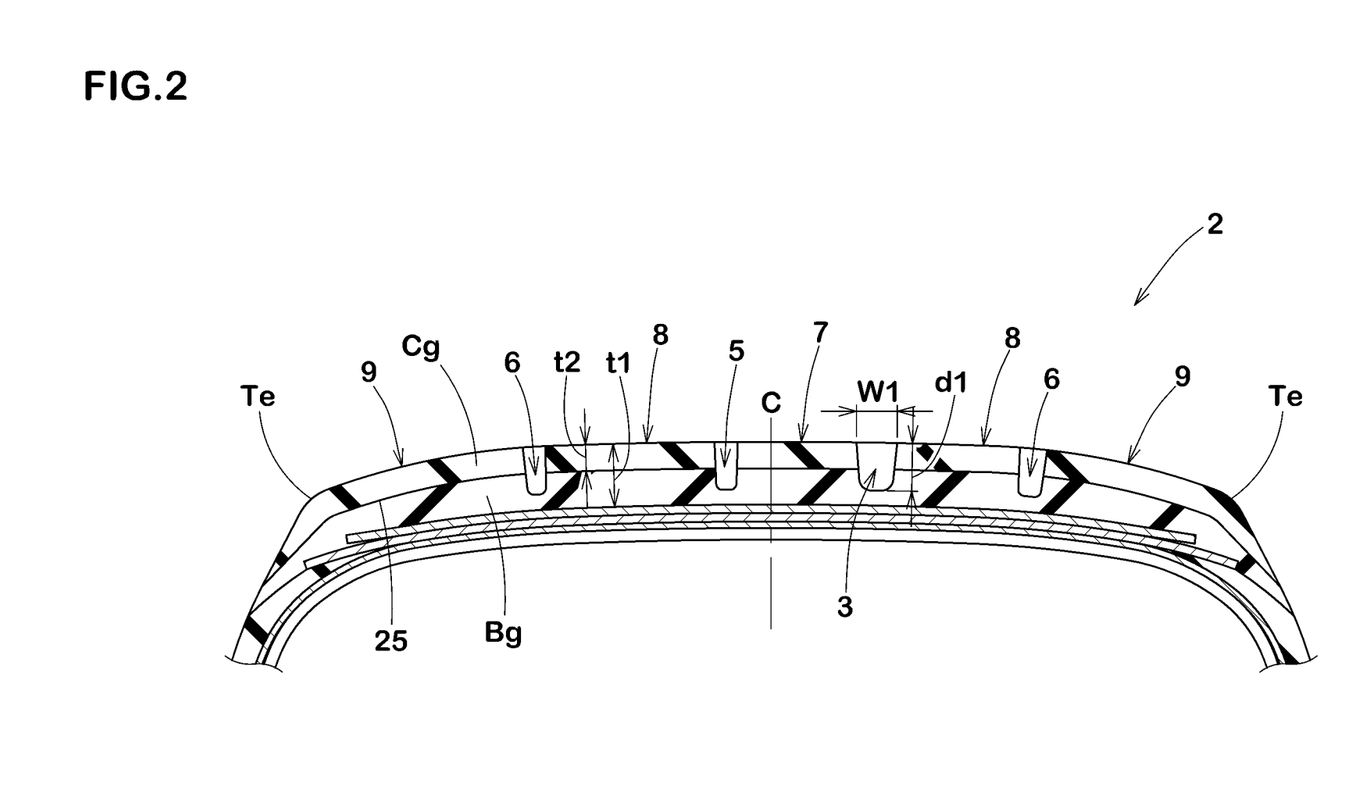
FIG. 2 is a cross-sectional view of the tread portion of FIG. 1.

FIG. 2 illustrates a cross-sectional view of the tread portion 2. FIG. 2 shows a conceptual cross-section of the tread portion 2, and the cross sections of the sipes and lateral grooves observed in the plan view of the tread portion 2 are omitted in FIG. 2. As illustrated in FIG. 2, a groove width of the circumferential grooves 3 is preferably equal to or more than 3 mm. The maximum groove width W1 of the circumferential grooves 3 is, for example, in a range from 2.0% to 5.0% of the tread width TW (shown in FIG. 1). Further, the maximum groove depth d1 of the circumferential grooves 3 is, for example, in a range from 5 to 15 mm. Note that the tread width TW corresponds to the distance in the tire axial direction from one of the tread edges Te to the other tread edge Te in the normal state described above.

As illustrated in FIG. 1, in the present embodiment, the tread portion 2 is divided into five land portions 4 by the circumferential grooves 3. These land portions 4 include a crown land portion 7, two middle land portions 8, and two shoulder land portions 9. The crown land portion 7 is defined between the crown circumferential grooves 5. In each side of the tire equator C, the middle land portion 8 is defined between the crown circumferential groove 5 and the shoulder circumferential groove 6. In each side of the tire equator C, the shoulder land portion 9 is located outwardly in the tire axial direction of the shoulder circumferential groove 6 and include the respective tread edge Te.

In the present disclosure, the tread portion 2 is further provided with a plurality of lateral grooves 10. Thus, the land portions 4 are formed into block rows each including a plurality of blocks 11 divided by the lateral grooves 10. Further, the tread portion 2 includes a plurality of first blocks 13. In the present embodiment, the plurality of first blocks 13 is included in the pair of shoulder land portions 9. Accordingly, each block rows of the plurality of first block 13 constitutes the respective tread edges Te.

Figure 3:
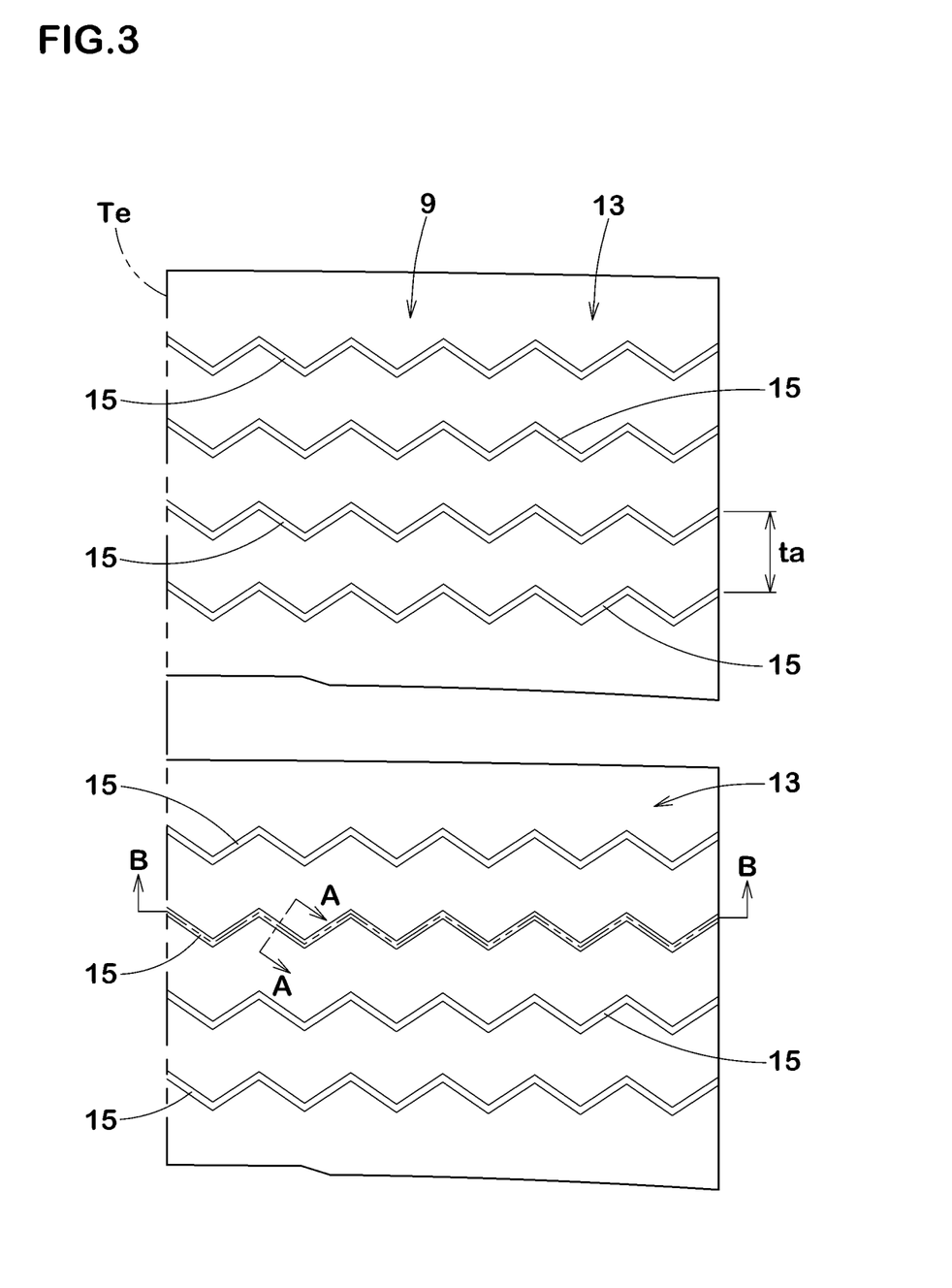
FIG. 3 is an enlarged view of first blocks of FIG. 1.

FIG. 3 illustrates an enlarged plan view of two first blocks 13. The first blocks 13 shown in FIG. 3 are those included in the left side shoulder land portion 9 shown in FIG. 1. As illustrated in FIG. 3, each first block 13 is provided with at least one the first sipe 15. As a preferred embodiment, each first block 13 according to the present embodiment is provided with a plurality of first sipes 15.

As used herein, "sipe" refers to an incision with a narrow width, where the width between the two inner walls facing each other is equal to or less than 1.5 mm. The opening of a sipe may be provided with a chamfer. In addition, as described below, a widened portion is connected to the bottom of each first sipe 15.

Figure 4:
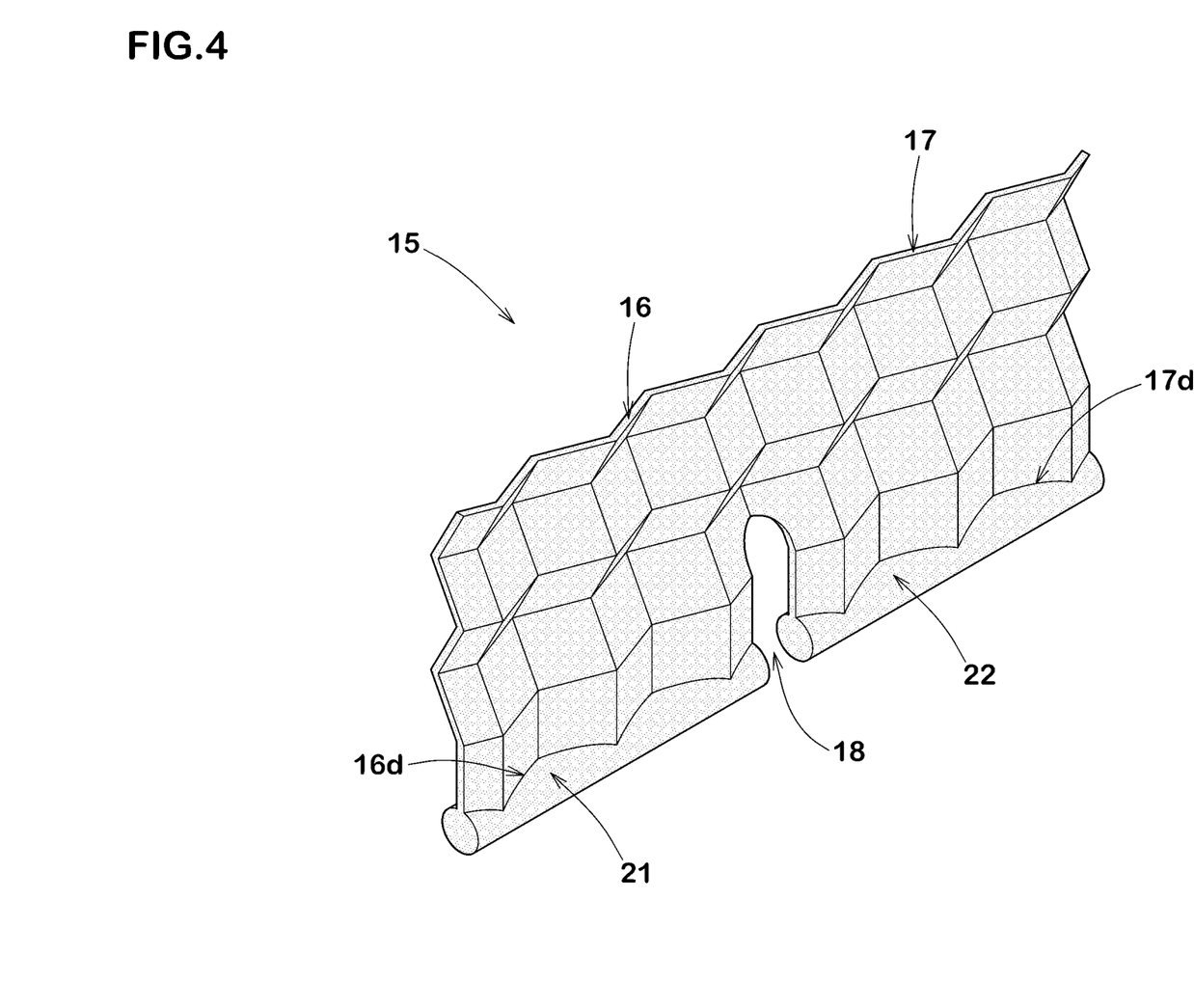
FIG. 4 is an enlarged perspective view conceptually showing the space defined by a first sipe.
Figure 5:
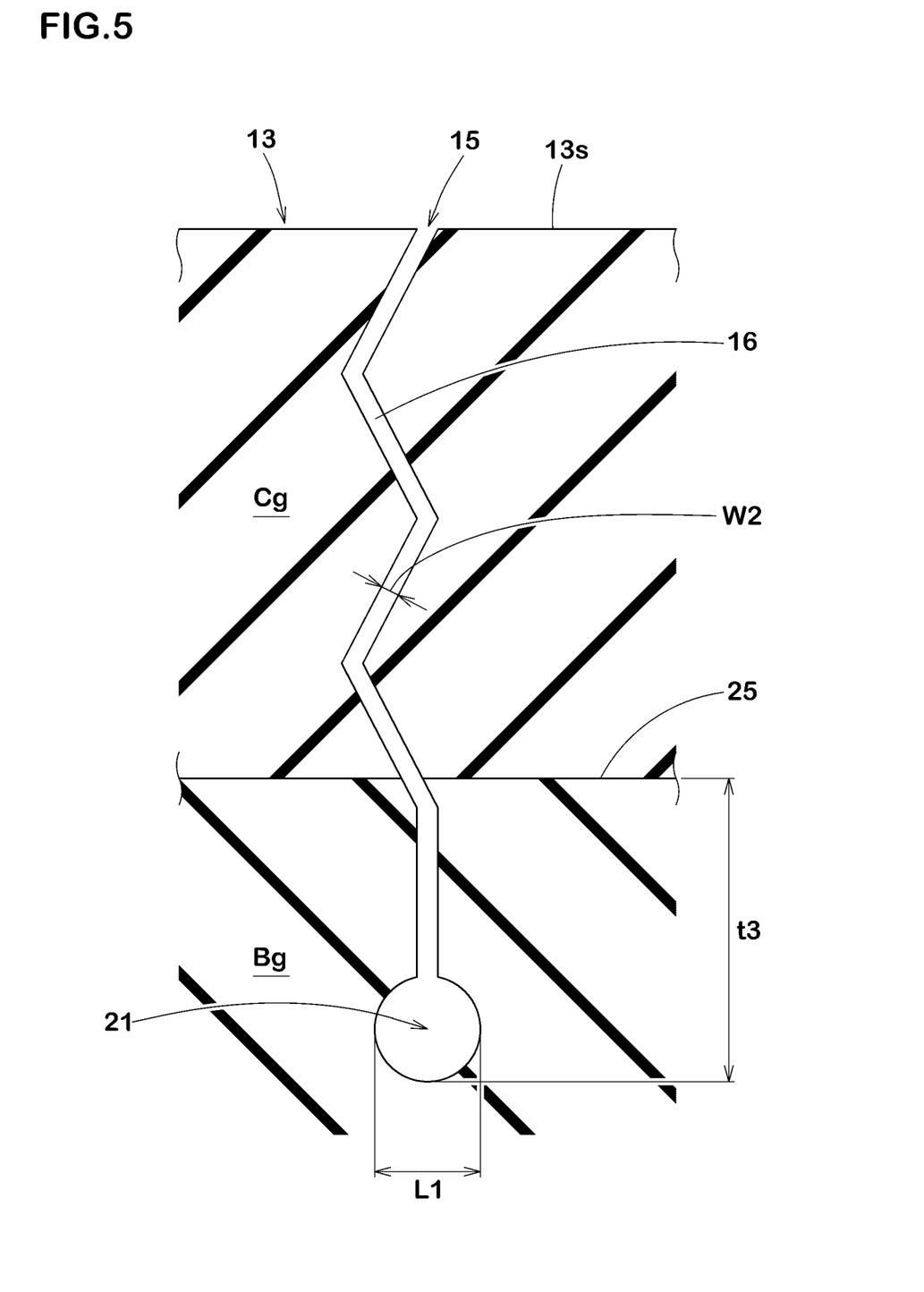
FIG. 5 is a cross-sectional view taken along line A-A of FIG. 3.
Figure 6:
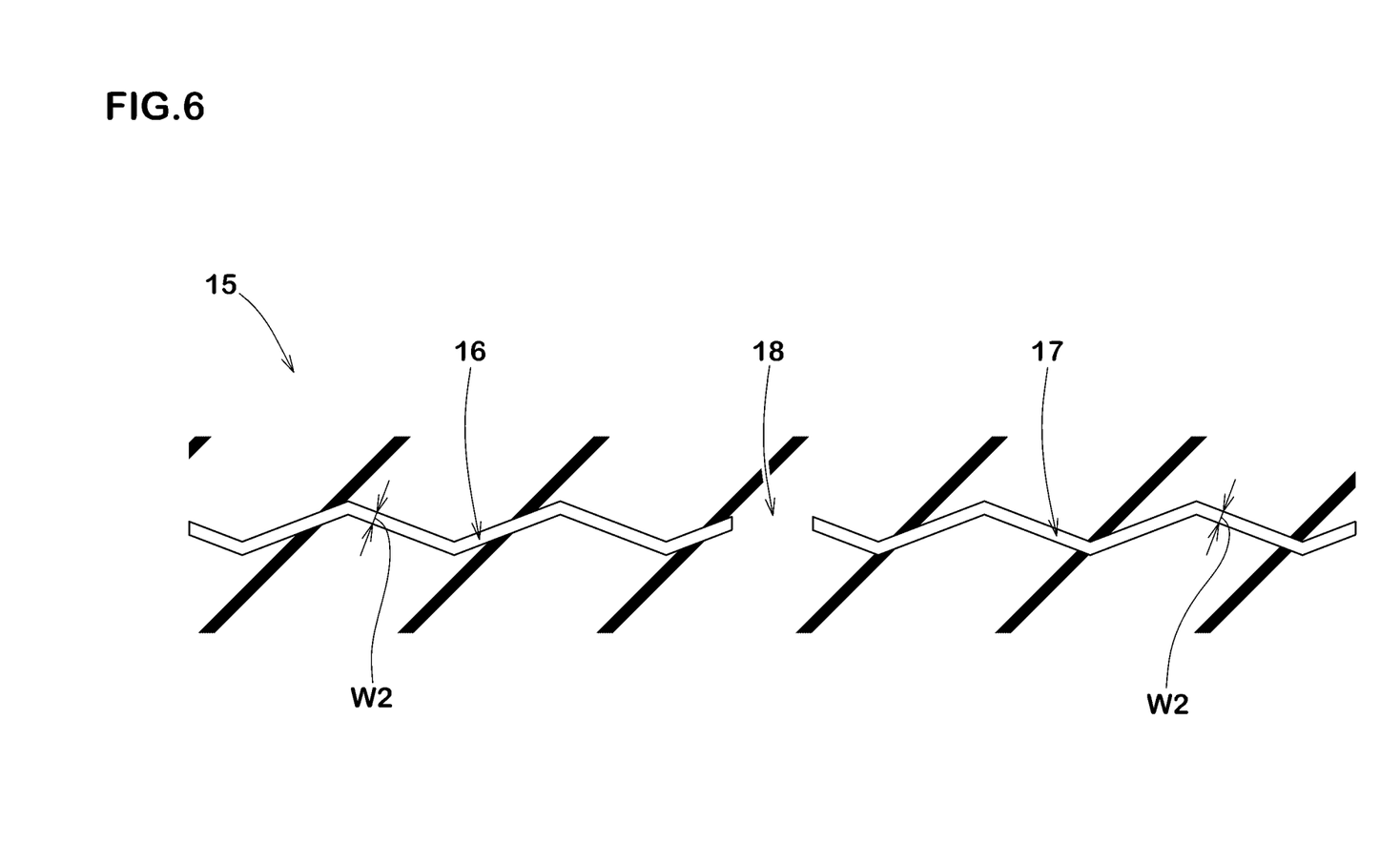
FIG. 6 is a partial cross-sectional view of first sipes in FIG. 3 parallel to the ground contact surface of the first block.

FIG. 4 is an enlarged perspective view conceptually showing the space defined by one of the first sipes 15. In FIG. 4, the above space is thinly dotted. FIG. 5 is a cross-sectional view perpendicular to the sipe length direction. FIG. 5 is a cross-sectional view including a first widening portion 21, which is described later, and corresponds to the A-A cross section of FIG. 3. FIG. 6 is a cross-sectional view of one first sipe in FIG. 3 parallel to the ground contact surface of one of the first blocks 13. As illustrated in FIGS. 4 to 6, each first sipe 15 according to the present disclosure extends in a zigzag shape in both of a cross-section perpendicular to the sipe length direction and a cross-section parallel to the ground contact surface of the respective first block 13.

Figure 7:
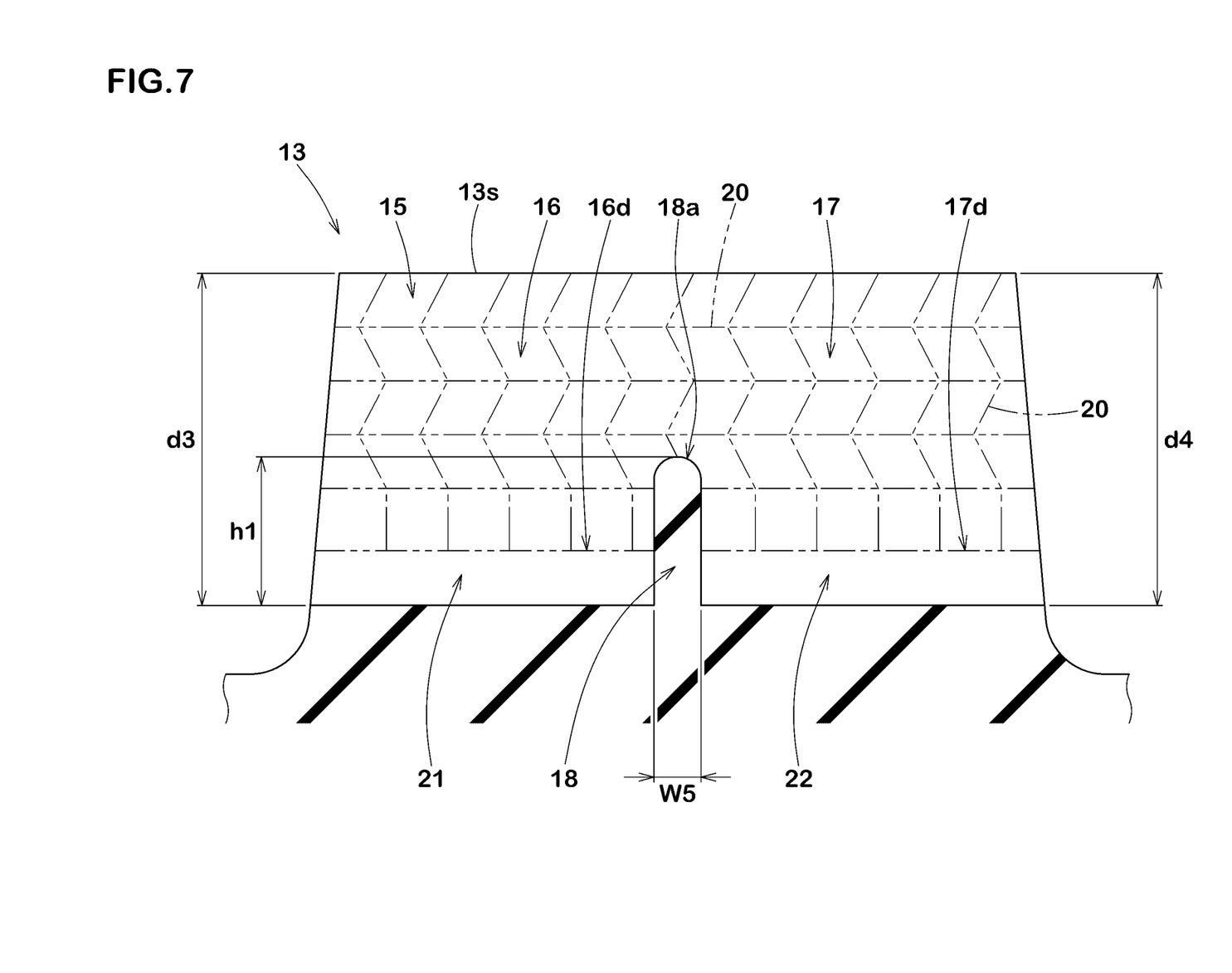
FIG. 7 is a cross-sectional view taken along line B-B of FIG. 3.

FIG. 7 illustrates a cross-sectional view along the sipe length direction of one of the first sipes 15. FIG. 7 corresponds to the B-B cross section of FIG. 3. Note that in FIG. 7, the ridgelines 20 that demarcate the unevenness of the sipe wall are shown conceptually as two dotted lines. As illustrated in FIG. 7, each first sipe 15 is divided into, at least, a first portion 16 and a second portion 17 in the sipe length direction by at least one tie-bar 18. The tie-bar 18 locally raises outwardly in the tire radial direction from the sipe bottom and terminates without reaching the ground contact surface 13s of the first block 13. Note that in the area between the tie-bar 18 and the ground contact surface 13s of the first block 13, an imaginary line (not shown) that extends the center line in the width direction of the tie-bar 18 to the outside in the tire radial direction is the boundary between the first portion 16 and the second portion 17.

As illustrated in FIG. 4, the sipe bottom 16d of the first portion 16 communicates with a first widening portion 21 having a circular shape in a cross-section. Further, as illustrated in FIG. 5, the first widening portion 21 has a groove width greater than a width of the first portion 16. Furthermore, as illustrated in FIG. 4, the first widening portion 21 extends linearly over the entire length thereof along the sipe length direction of the first portion 16.

Similarly, as illustrated in FIG. 4 and FIG. 5, the sipe bottom 17d of the second portion 17 communicates with a second widening portion 22 having a circular shape in a cross-section. The second widening portion 22 has a groove width greater than a width of the plurality second portion 17. In addition, the second widening portion 22 extends linearly over the entire length thereof along the sipe length direction of the second portion 17. Furthermore, the first widening portion 21 does not communicate with the second widening portion 22. Unless otherwise noted, the configuration described for the first widening portion 21 in the specification can be applied to the second widening portion 22. The tire 1 according to the present disclosure employs the configuration described above, and this makes it possible to improve the on-ice performance and the load durability. The reasons are as follows.

Each first sipe 15 of the tire 1 according to the present disclosure extends in a zigzag shape as described above. In addition, each first sipe 15 is divided into the first portion 16 and the second portion 17 by the tie-bar 18. In such a first sipe 15, when the ground load is applied to the first block 13, the sipe walls of the first sipe 15 facing each other are tightly engaged to maintain the rigidity of the first block 13. Furthermore, the tie-bar 18 also helps maintain the rigidity of the first block 13. As a result, the deformation of the first block 13 can be effectively suppressed, and the strain at the bottom of the sipe 15 can be suppressed, improving the load durability.

In addition, as illustrated in FIG. 4, each first sipe 15 according to the present disclosure communicates with the first widening portion 21 and the second widening portion 22 each having a circular cross section, and the first widening portion 21 and the second widening portion 22 do not communicate with each other. Thus, even if the first blocks 13 deform, the strain can be dispersed at the sipe bottom of each first sipe 15, and the damage thereto can be suppressed.

Further, due to the above-mentioned mechanism, the deformation of the first block 13 can be suppressed, ensuring a large contact area when driving on ice, and the edge effect of the first sipes 15 can provide a large frictional force. Furthermore, since each first sipe 15 includes the first widening portion 21 and the second widening portion 22, each first sipe 15 exhibits excellent water absorption performance and can further enhance the on-ice performance. For the reasons described above, the tire 1 according to the present disclosure can improve the on-ice performance and the load durability.

Hereinafter, a more detailed configuration of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

As illustrated in FIG. 1, the tread portion 2 is divided into five regions in the tire axial direction including two outer regions 2A on the respective tread edge Te side, and three inner regions 2B therebetween. It is preferable that the first blocks 13 are included in the outer regions 2A. In the present embodiment, the first blocks 13 are included in the shoulder land portions 9, and the plurality of first blocks 13 constitute the respective tread edges Te. As a result, since each first sipe 15 is arranged in the shoulder land portions 9 where ground contact pressure tends to increase, the load durability can reliably be improved.

As illustrated in FIG. 3, it is preferable that each first block 13 is provided with a plurality of first sipes 15. In the present embodiment, each first block 13 is provided with four first sipes 15, and each first sipe 15 traverses the first blocks 13 in the tire axial direction. In addition, each first block 13 is not provided with any sipes or grooves other than the first sipes 15. However, the present disclosure is not limited to such an aspect. For example, one or some first blocks 13 may be provided with a circumferential narrow groove extending in the tire circumferential direction. Note that although each figure herein describes the configuration of a single first sipe 15, these configurations can be expanded to each of the first sipes 15 described above.

A distance ta between two adjacent first sipes 15 in the tire circumferential direction (corresponding to the circumferential distance between the sipe centerlines) is, for example, in a range from 3.0 to 7.0 mm, preferably 4.0 to 6.0 mm. This allows for excellent on-ice performance while suppressing the uneven wear of the first blocks 13.

As illustrated in FIG. 5, each first sipe 15, in a cross-sectional view perpendicular to the sipe length direction, extends in the tire radial direction with a constant width W2. In addition, as illustrated in FIG. 6, each first sipe 15 extends in the sipe length direction while maintaining the constant width W2. That is, each first sipe 15 according to the present embodiment extends with a constant width W2 over the entire length and depth thereof. The width W2, for example is preferably equal to or less than 1.0 mm, more preferably in a range from 0.2 to 0.7 mm. Thus, both the load durability and the on-ice performance can be improved in a well-balanced manner. However, the present disclosure is not limited to such an aspect, and the inevitable errors in rubber products such as tires can be tolerated. Therefore, the width of each first sipe 15 may vary depending on its measurement position. In this case, the ratio W2M/W2m between the maximum value W2M and the minimum value W2m (not shown) of the widths of each first sipe 15 is preferably equal to or less than 2.0. The maximum value of W2M is preferably in a range from 0.4 to 0.7 mm. The minimum value of W2m is preferably in a range from 0.2 to 0.4 mm.

As illustrated in FIG. 7, in each first block 13, a maximum depth d3 from the ground contact surface 13s to a bottom of the first widening portion 21 is in a range from 4.0 to 9.0 mm. Similarly, in each first block 13, a maximum depth d4 from the ground contact surface 13s to a bottom of the second widening portion 22 is in a range from 4.0 to 9.0 mm. This structure can improve both the load durability and the on-ice performance in a well-balanced manner. As a preferred aspect, in this embodiment, the depth d3 and d4 are the same.

Each tie-bar 18 is located, for example, in the central region of the respective first sipe 15 when the first sipe 15 is divided into three equal parts in the sipe length direction. In some more preferred aspects, each tie-bar 18 in this embodiment is preferably arranged to include the central position of the respective first sipe 15 in the sipe length direction. This can prevent local deformation of the respective first sipe 15 and can provide excellent load durability.

In the present embodiment, each tie-bar 18 extends in the tire radial direction with a constant width, for example. The outermost end 18a in the tire radial direction of each tie-bar 18 has an arcuate outer surface convex toward the ground contact surface 13s. The maximum width W5 of each tie-bar 18 in the section along the sipe length direction of the first sipe 15 is, for example, in a range from 0.5 to 5.0 mm.

In at least one of the first sipes 15, a height h1 from a bottom of the first widening portion 21 to the outermost end of the tie-bar 18 in the tire radial direction is preferably equal to or more than 30% of the maximum depth d3 from the ground contact surface 13s of the first block 13 to the bottom of the first widening portion 21, more preferably equal to or more than 40%, but preferably equal to or less than 80%, more preferably equal to or less than 70%. The tie-bar 18 like this can help to balance the load durability and the on-ice performance.

As illustrated in FIG. 4, each first widening portion 21 extends linearly in the sipe length direction of the first sipe 15 while maintaining a circular cross-sectional shape. As a result, each first widening portion 21 has a cylindrical shape, except for the portion that is connected to the first sipe 15.

In addition, the set of circular centers in the cross section of the first widening portion 21 becomes the central axis of the first widening portion 21, and this central axis extends linearly. The same applies to the second widening portion 22.

As illustrated in FIG. 5, in a cross-section perpendicular to the sipe length direction of each first sipe 15, a diameter LI of the first widening portion 21 is preferably equal to or more than 2.0 times a width of the first sipe 15, more preferably equal to or more than 3.0 times, but preferably equal to or less than 6.0 times, more preferably equal to or less than 5.0 times. As a result, the above-mentioned effects can be obtained while demonstrating excellent demoldability during tire production. The above-mentioned "the width of the first sipe 15" means a constant width W2 in this embodiment, and if the width varies depending on the measurement position, it means the maximum width.

In the same point of view, in a cross-section perpendicular to the sipe length direction of each first sipe 15, a diameter of the second widening portion 22 is preferably equal to or more than 2.0 times a width of the first sipe 15, more preferably equal to or more than 3.0 times, but preferably equal to or less than 6.0 times, more preferably equal to or less than 5.0 times.

As illustrated in FIG. 4, in each first sipe 15, it is preferable that the ratio V1/V2 between the volume V1 of the first widening portion 21 and the volume V2 of the second widening portion 22 is in a range from about 0.8 to 1.2, and in this embodiment, these volumes are substantially the same.

In another embodiment, in at least one of the first sipes 15, the first widening portion 21 may be arranged on the tread edge Te side with respect to the second widening portion 22, and the volume V1 of the first widening portion 21 may be greater than the volume V2 of the second widening portion 22. In this case, the volume V1 is preferably in a range from 120% to 150% of the volume V2. In this embodiment, since each first widening portion 21 near the tread edge Te can exhibit excellent water absorption, the on-ice performance can be improved, and an improvement in wandering performance can also be expected.

In yet another embodiment, in at least one of the first sipes 15, the first widening portion 21 may be arranged on the tread edge Te side with respect to the second widening portion 22, and the volume V1 of the first widening portion 21 may be smaller than the volume V2 of the second widening portion 22. In this case, the volume V1 is preferably in a range from 50% to 80% of the volume V2. In this embodiment, since each first widening portion 21 near the tread edge Te has relatively small volume, the uneven wear around the tread edge Te can be suppressed.

As illustrated in FIG. 2, the tread portion 2 of the present embodiment includes a cap rubber layer Cg and a base rubber layer Bg. The cap rubber layer Cg constitutes the ground contact surface of the tread portion 2. The base rubber layer Bg is disposed inwardly in the tire radial direction of the cap rubber layer Cg. A rubber hardness of the cap rubber layer Cg is, for example, in a range from 40 to 65 degrees. The base rubber layer Bg has a rubber hardness greater than that of the cap rubber layer Cg. The rubber hardness of the base rubber layer Bg is, for example, in a range from 50 to 75 degrees. As used herein, rubber hardness is the hardness measured by durometer type A in an environment of 23 degrees C. in accordance with JIS-K6253.

In the present embodiment, a distance t2 from the ground contact surface of the tread portion 2 to the boundary 25 between the cap rubber layer Cg and the base rubber layer Bg is in a range from 30% to 70% of the total thickness t1 of the tread rubber. On the other hand, as illustrated in FIG. 5, the minimum distance t3 in the tire radial direction from the boundary 25 to the bottom of the first widening portions 21 and the second widening portions 22 is preferably equal to or more than 0.5 mm, more preferably in a range from 1.0 to 4.0 mm. This effectively suppresses the peeling of the rubber at the boundary 25 caused by the deformation of the first widening portions 21 and the second widening portions 22.

While the particularly preferred embodiments of the tire according to the present disclosure have been described in detail, the present disclosure is not limited to the above specific embodiments, but may be modified and implemented in various ways.

[Additional Note]

The present disclosure includes the following aspects.

[Note 1]

A tire comprising:

a tread portion being provided with a plurality of circumferential grooves continuously extending in a tire circumferential direction, a plurality of lateral grooves extending in a tire axial direction, and a plurality of first blocks, wherein each of the plurality of first blocks is provided with at least one first sipe, the at least one first sipe extends in a zigzag shape in both of a cross-section perpendicular to a sipe length direction and a cross-section parallel to a ground contact surface of the respective first block, the at least one first sipe comprises a sipe bottom, and a tie-bar locally raising outwardly in a tire radial direction from the sipe bottom and terminating without reaching the ground contact surface of the respective first block to divide the at least one first sipe into a first portion and a second portion in the sipe length direction, the sipe bottom of the first portion communicates with a first widening portion having a circular shape in a cross-section perpendicular to the sipe length direction, the first widening portion has a groove width greater than a width of the first portion, the first widening portion extends linearly over an entire length thereof along the sipe length direction of the first portion, the sipe bottom of the second portion communicates with a second widening portion having a circular shape in a cross-section perpendicular to the sipe length direction, the second widening portion has a groove width greater than a width of the second portion, the second widening portion extends linearly over its entire length along the sipe length direction of the second portion, and the first widening portion does not communicate with the second widening portion.

[Note 2]

The tire according to note 1, wherein the tread portion comprises a tread edge, and the plurality of first blocks constitutes the tread edge.

[Note 3]

The tire according to note 1 or 2, wherein in each first block, a maximum depth from the ground contact surface to a bottom of the first widening portion or the second widening portion is in a range from 4.0 to 9.0 mm.

[Note 4]
The tire according to any one of notes 1 to 3, wherein
the at least one first sipe has a width in a range from 0.2 to 0.7 mm in a cross-section perpendicular to the sipe length direction.

[Note 5]
The tire according to any one of notes 1 to 4, wherein
a diameter of the circular shape of the first widening portion is in a range from 2.0 to 6.0 times a width of the at least one first sipe in a cross-section perpendicular to the sipe length direction.

[Note 6]
The tire according to any one of notes 1 to 5, wherein
a diameter of the circular shape of the second widening portion is in a range from 2.0 to 6.0 times a width of the at least one first sipe in a cross-section perpendicular to the sipe length direction.

[Note 7]
The tire according to any one of notes 1 to 6, wherein
in at least one of the plurality of first blocks, a height from a bottom of the first widening portion to an outermost end of the tie-bar in the tire radial direction is in a range from 30% to 80% of a maximum depth from the ground contact surface of the first block to the bottom of the first widening portion.

[Note 8]
The tire according to any one of notes 1 to 7, wherein
the tie-bar has a width in a range from 0.5 to 5.0 mm in a cross-section parallel to the sipe length direction.

[Note 9]
The tire according to any one of notes 1 to 8, wherein
the tread portion comprises a cap rubber layer forming the ground contact surface, and a base rubber layer disposed inwardly in the tire radial direction of the cap rubber layer and having a hardness greater than that of the cap rubber layer, and
at least a part of the first widening portion and the second widening portion is located in the base rubber layer.

[Note 10]
The tire according to note 9 wherein
a minimum distance in the tire radial direction from a boundary between the cap rubber layer and the base rubber layer to a bottom of the first widening portion and a bottom of the second widening portion is equal to or more than 0.5 mm.

[Note 11]
The tire according to any one of notes 1 to 10 wherein
the tread portion comprises a tread edge,
the first widening portion is arranged on a tread edge side with respect to the second widening portion, and
a volume of the first widening portion is greater than a volume of the second widening portion.

The invention claimed is:

1. A tire comprising:
a tread portion being provided with a plurality of circumferential grooves continuously extending in a tire circumferential direction, a plurality of lateral grooves extending in a tire axial direction, and a plurality of first blocks, wherein
each of the plurality of first blocks is provided with at least one first sipe having a sipe wall,
the at least one first sipe extends in a zigzag shape in both of a cross-section perpendicular to a sipe length direction and a cross-section parallel to a ground contact surface of the respective first block,
the sipe wall has a plurality of ridgelines that extend in zigzag shape in a tire radial direction and demarcate the unevenness of the sipe wall,
the at least one first sipe comprises a sipe bottom, and a tie-bar locally raising outwardly in a tire radial direction from the sipe bottom and terminating without reaching the ground contact surface of the respective first block to divide the at least one first sipe into a first portion and a second portion in the sipe length direction,
the sipe bottom of the first portion communicates with a first widening portion having a circular shape in the cross-section perpendicular to the sipe length direction,
the first widening portion has a groove width greater than a width of the first portion,
the first widening portion extends linearly over an entire length thereof along the sipe length direction of the first portion,
the sipe bottom of the second portion communicates with a second widening portion having a circular shape in the cross-section perpendicular to the sipe length direction,
the second widening portion has a groove width greater than a width of the second portion,
the second widening portion extends linearly over its entire length along the sipe length direction of the second portion,
the first widening portion does not communicate with the second widening portion,
the tie-bar has a width in a range from 0.5 to 5.0 mm in the cross-section parallel to the sipe length direction, and
the tie-bar is formed such that only one of the plurality of ridgelines of the sipe wall is connected to the tie-bar.

2. The tire according to claim 1, wherein
the tread portion comprises a tread edge, and
the plurality of first blocks constitutes the tread edge.

3. The tire according to claim 1, wherein
in each first block, a maximum depth from the ground contact surface to a bottom of the first widening portion or the second widening portion is in a range from 4.0 to 9.0 mm.

4. The tire according to claim 1, wherein
the at least one first sipe has a width in a range from 0.2 to 0.7 mm in the cross-section perpendicular to the sipe length direction.

5. The tire according to claim 1, wherein
a diameter of the circular shape of the first widening portion is in a range from 2.0 to 6.0 times a width of the at least one first sipe in the cross-section perpendicular to the sipe length direction.

6. The tire according to claim 1, wherein
a diameter of the circular shape of the second widening portion is in a range from 2.0 to 6.0 times a width of the at least one first sipe in the cross-section perpendicular to the sipe length direction.

7. The tire according to claim 1, wherein
in at least one of the plurality of first blocks, a height from a bottom of the first widening portion to an outermost end of the tie-bar in the tire radial direction is in a range from 30% to 80% of a maximum depth from the ground contact surface of the first block to the bottom of the first widening portion.

8. The tire according to claim 1, wherein
the tread portion comprises a cap rubber layer forming the ground contact surface, and a base rubber layer disposed inwardly in the tire radial direction of the cap rubber layer and having a hardness greater than that of the cap rubber layer, and at least a part of the first widening portion and the second widening portion is located in the base rubber layer.

9. The tire according to claim 8 wherein
a minimum distance in the tire radial direction from a boundary between the cap rubber layer and the base rubber layer to a bottom of the first widening portion and a bottom of the second widening portion is equal to or more than 0.5 mm.

10. The tire according to claim 1 wherein
the tread portion comprises a tread edge,
the first widening portion is arranged on a tread edge side with respect to the second widening portion, and
a volume of the first widening portion is greater than a volume of the second widening portion.

11. The tire according to claim 10 wherein
the volume of the first widening portion is in a range from 120% to 150% of the volume of the second widening portion.

12. The tire according to claim 11 wherein
the first widening portion and the second widening portion have a same length in the sipe length direction with each other.

13. The tire according to claim 1 wherein
the tread portion comprises a tread edge,
the first widening portion is arranged on a tread edge side with respect to the second widening portion, and
a volume of the first widening portion is smaller than a volume of the second widening portion.

14. The tire according to claim 13 wherein
the volume of the first widening portion is in a range from 50% to 80% of the volume of the second widening portion.

15. The tire according to claim 14 wherein
the first widening portion and the second widening portion have a same length in the sipe length direction with each other.

16. The tire according to claim 1, wherein
the tie-bar is arranged to include a central position of each first sipe in the sipe length direction.

17. The tire according to claim 1, wherein
the at least one first sipe comprises a plurality of first sipes.

* * * * *